Dec. 8, 1953 W. L. ENGHAUSER 2,661,556
AUTOMATIC GATE OPERATING MECHANISM
Filed Jan. 3, 1951 7 Sheets-Sheet 2

INVENTOR.
Winford L. Enghauser.
BY
Wood, Arey, Herron & Evans.
ATTORNEYS.

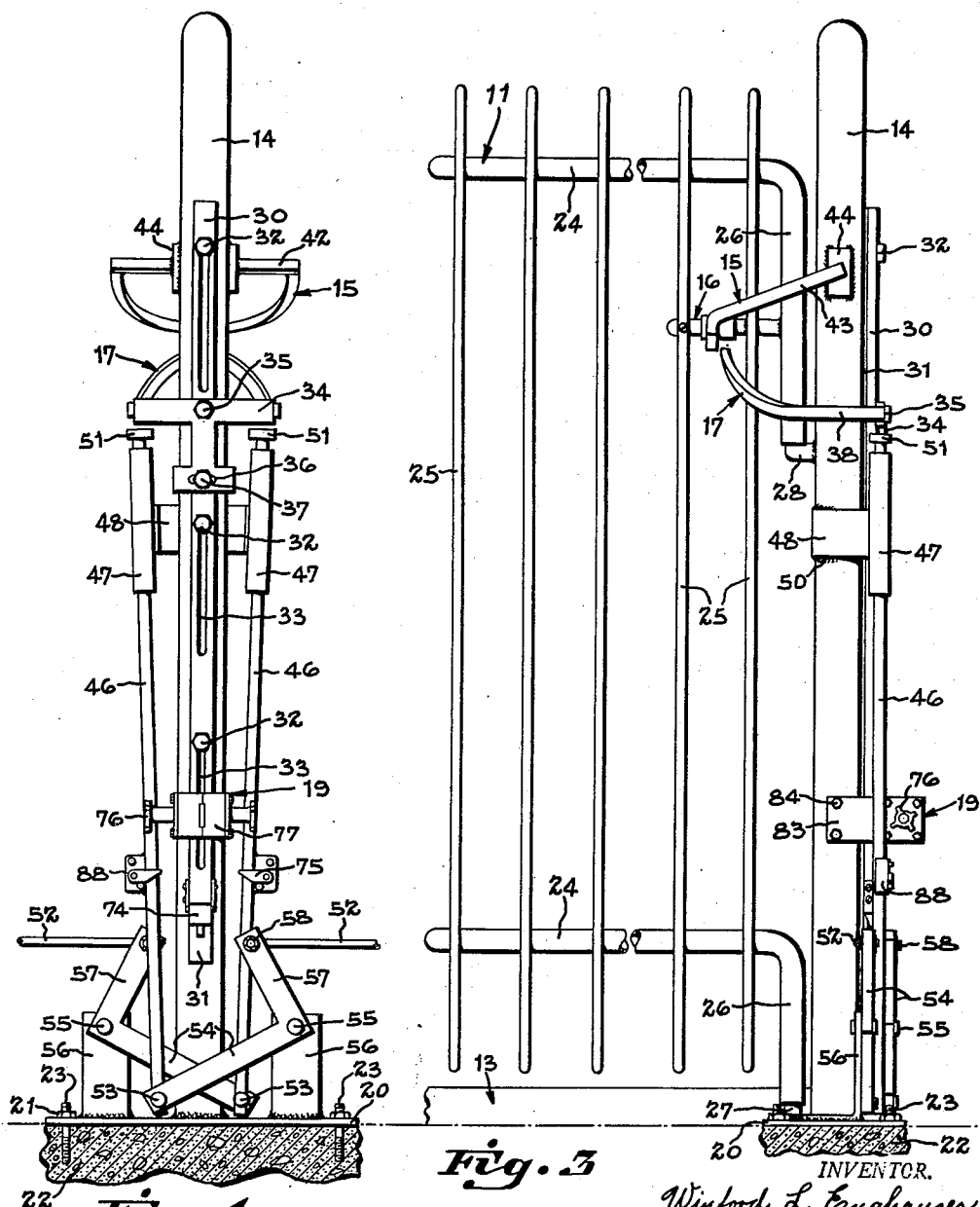

Dec. 8, 1953   W. L. ENGHAUSER   2,661,556
AUTOMATIC GATE OPERATING MECHANISM
Filed Jan. 3, 1951   7 Sheets-Sheet 4

INVENTOR.
Winford L. Enghauser.
BY
Wood, Arey, Herron & Evans.
ATTORNEYS.

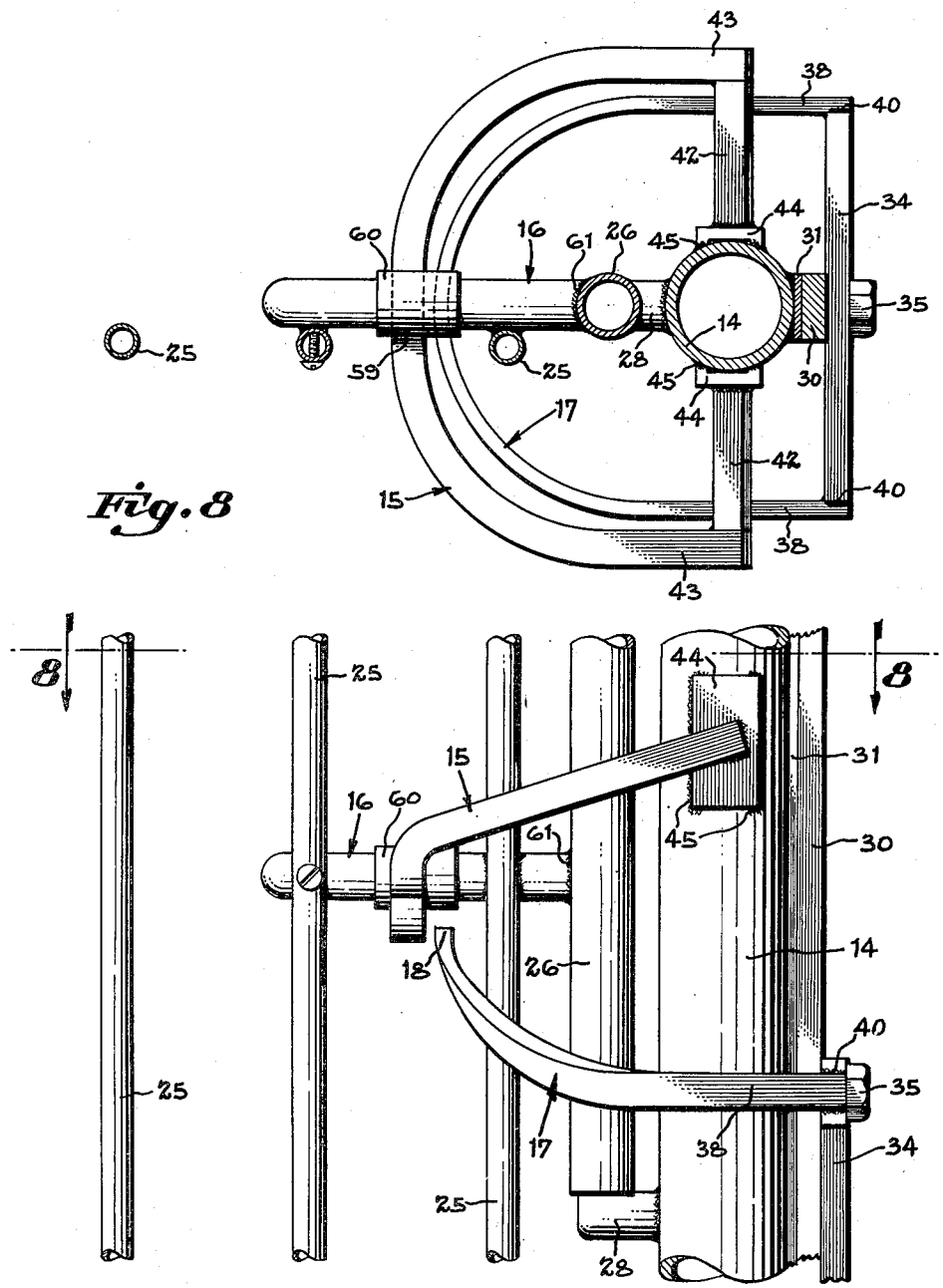

Dec. 8, 1953   W. L. ENGHAUSER   2,661,556
AUTOMATIC GATE OPERATING MECHANISM
Filed Jan. 3, 1951   7 Sheets-Sheet 6
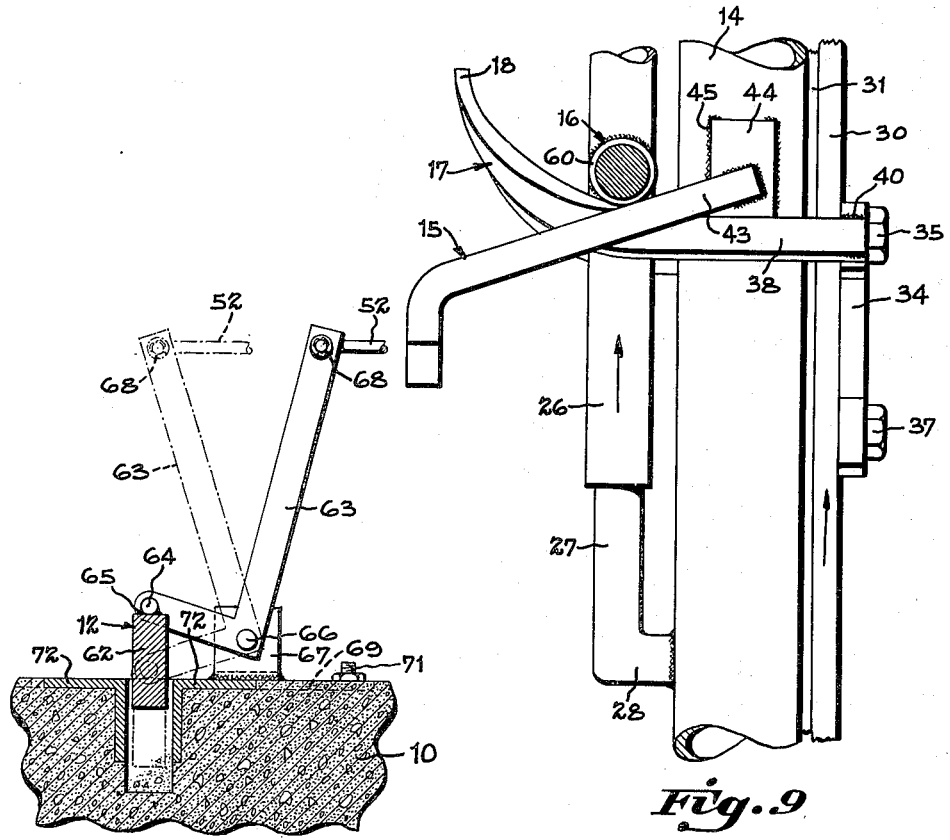
Fig.9
Fig.12
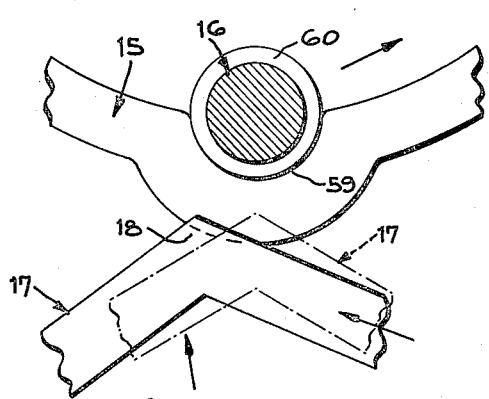
Fig.10
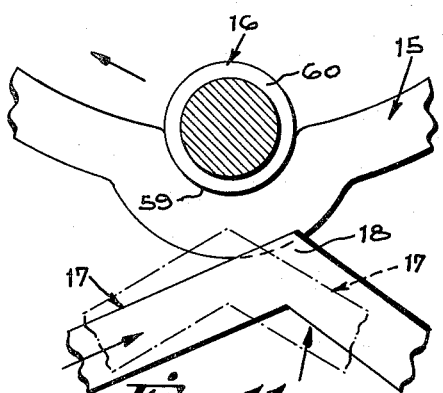
Fig.11
INVENTOR.
Winford L. Enghauser.
BY
Wood, Arey, Herron & Evans,
ATTORNEYS.

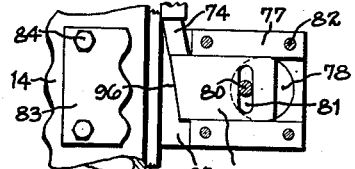
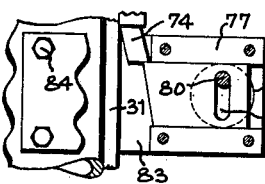
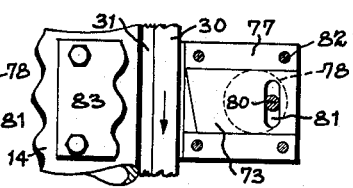
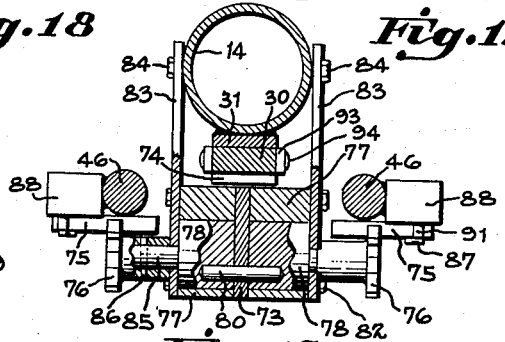
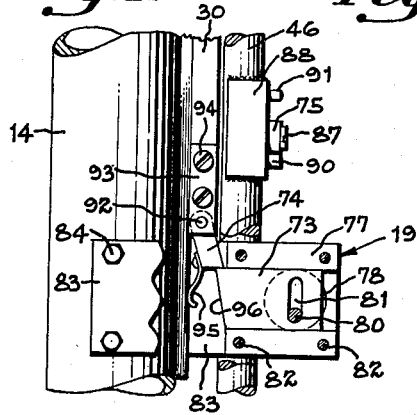
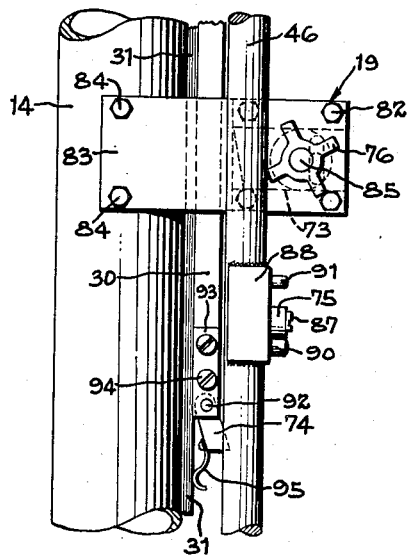
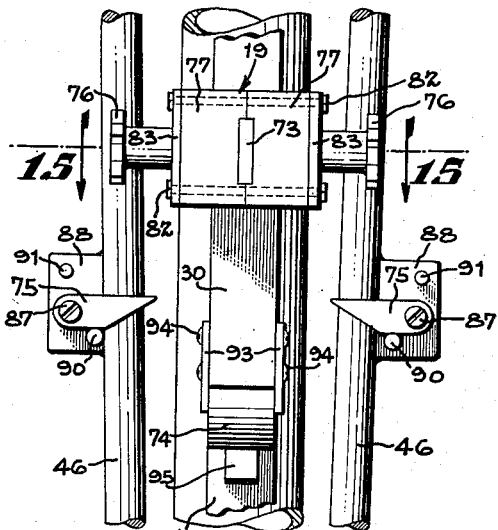

Patented Dec. 8, 1953

2,661,556

UNITED STATES PATENT OFFICE 2,661,556

AUTOMATIC GATE OPERATING MECHANISM

Winford L. Enghauser, Cincinnati, Ohio

Application January 3, 1951, Serial No. 204,233

10 Claims. (Cl. 39—55)

This invention relates to a mechanism which responds automatically to the approach of a passenger car or truck to operate a swinging gate, door or the like so as to permit the vehicle conveniently to pass through the gateway. The apparatus is powered by treadles placed in the path of travel and is arranged to open the gate automatically when the vehicle approaches, to hold it ajar while the vehicle passes through and to close the gate after the vehicle has cleared the gateway.

The improved structure is particularly useful as an actuating medium for driveway gates of the type used on farms and country estates where it is desirable or necessary to keep the gate closed to prevent livestock from straying, or in the case of city or suburban property, to discourage trespassers from entering the premises. It is well known that driving through the ordinary farm or driveway gate involves a great deal of inconvenience and delay since it requires the driver to stop the vehicle, unlatch and open the gate, drive the vehicle through and again stop in order to close and latch the gate before going on. Leaving the premises of course involves the same irksome routine; consequently there is a natural tendency to leave the gate open if the weather is bad or if it is not absolutely necessary to close it.

Automatic gate mechanisms may be grouped into two classes; namely, those which are powered by a motor and those which derive their motive power from the approaching vehicle itself, as in the present case. Both types of apparatus have been proposed in the past but for various reasons, neither type has gone into widespread use. Manual contrivances employing a hand lever, pull rope or other device which can be operated by the driver or passenger without leaving the vehicle, have enjoyed some measure of success in the past. However, these devices are not automatic in character but depend upon the driver for operation, therefore, the gates frequently are left open.

One of the primary objects of the invention has been to provide a simple and reliable mechanism which operates automatically to keep the gate normally latched in closed position and which derives its motive power from the approaching vehicle to unlatch and swing the gate open and to close and latch the gate after the vehicle has cleared the gateway. By actuating the gate in response to the vehicle itself, it is, of course, unnecessary for the driver to leave the vehicle either to open or close the gate; consequently, there is no possibility of the gates being accidently left open after driving through the gateway. The arrangement is of particular convenience in bad weather or at night since it is not necessary for the driver to leave the vehicle and grope around in the dark to reach an operating device.

The mechanism is such that the gate is normally urged to a closed position by gravity and is opened when the vehicle wheels depress a treadle located in the path of travel such as the driveway. The treadle structure is designed to take advantage of the cushioning effect of pneumatic car or truck tires and for this purpose they provide a short stroke and high resistance against downward movement. Thus, when the wheel depresses the treadle, the tire deflects temporarily so as to damp the gate opening force. The treadles project only a slight elevation above the plane of the driveway and do not interfere with walking. When nearing the treadle, the vehicle should be slowed down and preferably, but not necessarily, should be stopped momentarily with the wheels resting upon the treadle in order to allow the gate gradually to swing open. However, if the wheels pass over the treadle and depress and release it quickly, the actuating mechanism will compensate automatically and swing the gate at a moderate rate of speed to open position.

A further object has been to provide a structure which is capable of swinging the gate to open position in either direction in accordance with the direction of vehicle travel such that the gates open and close in one cycle upon entering the premises, and in the opposite direction, open and close in a second cycle when the vehicle leaves. This is accomplished by locating treadles at opposite sides of the gate and interconnecting them with direction responsive mechanism arranged to swing the gate in the same direction the vehicle is headed; in other words, the gate swings away from the vehicle when one treadle is depressed upon entering the driveway and again swings open away from the vehicle upon leaving the premises. Thus, it is not necessary to provide extensive clearance between the vehicle and gate as would be the case were the gates swung toward the vehicle upon opening them; furthermore, by swinging the gate away from the vehicle, it is impossible for the vehicle to jam up against the swinging end of the gate as the vehicle passes through the gateway.

Still another object of the invention has been to provide means for holding the gate temporarily in open position so as to prevent the gate from swinging shut and striking the vehicle before it has cleared the gateway.

Briefly, it is the concept of the inventor to provide a treadle operated structure including a movable cam arranged to swing the gate open in either direction depending upon alternate operation of the treadles and a cooperating fixed cam arranged to swing the gate to closed position by gravity combined with a retarding device which functions to latch the gate temporarily in open position to permit the vehicle to pass through the gateway.

In the structural embodiment of the invention disclosed in the specification and drawings, the mechanism is applied to a double driveway gate assembly consisting of two gate sections hinged at opposite sides of the driveway and arranged to swing in either direction from closed to open position. Each gate section is provided with an individual actuating mechanism, and both mechanisms are connected in common to the treadles which are located at opposite sides of the gateway. Depressing the treadle at one side of the gate causes the movable cam to engage a cam follower on the gate and swing the gate to open position in a direction away from the vehicle. Depressing the treadle on the opposite side causes the cam to swing the gate in the opposite direction.

The moving cam has oppositely inclined surfaces extending downwardly from a central spur and the cam follower normally occupies a position above the spur. The cam is arranged to be tilted laterally to the right or left then elevated upon alternate actuation of the treadles thereby to engage the oppositely inclined surfaces selectively against the follower. In operation, the lateral tilting movement of the cam occurs first, then the cam is forced upwardly against the follower to swing the gate in the direction determined by the lateral position of the cam.

The fixed cam is related to the movable cam in such manner that the follower is contacted by both cams, the fixed cam having upwardly inclined surfaces which are oppositely related to the downwardly inclined surfaces of the movable cam. The follower is engaged at the intersection of the two cam surfaces and is impelled upwardly along the inclined fixed cam surface by the moving cam. Thus, the gate is swung and also elevated bodily as its follower is tracked upwardly on the fixed cam. When the movable cam is released, it drops downwardly allowing the follower to slide down the inclined surface of the fixed cam and close the gate by gravity. At the bottom of the downwardly converging surfaces of the fixed cam, there is provided a recess which embraces the follower and latches the gate in closed position.

In its preferred form, the retarding device is actuated to a latching position when the vehicle passes over the treadle on the approach side of the gate and is moved to unlatching position when the vehicle depresses the treadle at the opposite side. Structurally the device consists of a latch plunger which is advanced in two steps to a latching position as the front and rear wheels depress the first treadle, the latch plunger being engageable with a bar which elevates the movable cam to gate opening position so as to hold the cam temporarily in elevated position. As the vehicle passes through the gateway and the front and rear wheels depress the second treadle, the latch bar is retracted correspondingly in two steps, causing the cam to drop and allowing the gate to close. The retarding device in this manner latches the gate open and the gate will so remain until the vehicle is driven through to depress the second treadle. The mechanism operates in the same manner whether the vehicle is entering or leaving the premises, and each gate section includes a retarding device to control its movements.

It is contemplated also to retard the gate by a time delay mechanism which is self-energizing upon elevation of the cam and arranged to latch the cam elevated for a predetermined time period before releasing it. This device is energized by the first treadle to be depressed by the vehicle in traveling either to or from the gateway. When the first treadle is depressed by the front wheels, the timer is set in gate arresting position and each subsequent impact upon the first and second treadles resets the timer as the vehicle passes through. The timer thus holds the gate or gates open for a predetermined time period after the second treadle is depressed by the rear wheels. This mode of operation is desirable where it is necessary to accommodate vehicles having extra sets of wheels such as trailers or dual wheeled vehicles which would render the treadle operated retarding mechanism inoperative.

Various other features and advantages of the invention will be more fully apparent to those skilled in the art from the following disclosure of a preferred embodiment of the invention.

In the drawings:

Figure 3 is an enlarged fragmentary side elevation taken on line 3—3, Figure 1, showing the gate and is actuating mechanism with the gate in closed position.

Figure 4 is an enlarged rear elevation taken on line 4—4, Figure 1, further illustrating the actuating mechanism for operating the gate.

Figure 7 is an enlarged fragmentary side elevation of a portion of the gatepost and gate, showing the relationship of the fixed and movable cams and the position of the follower when the gate is in closed position.

Figure 8 is a sectional view taken on line 8—8, Figure 7, further illustrating the cam and follower arrangement.

Figure 9 is a view similar to Figure 7, showing the movable cam in elevated position and the position assumed by the cam follower in gate open position.

Figures 10 and 11 are enlarged diagrammatic views illustrating selective rocking movement executed by the movable cam in determining the direction of gate swing upon depression of the respective treadles.

Figure 12 is an enlarged sectional view taken on line 12—12, Figure 1, detailing the treadle arrangement and showing in broken lines the position of the bell crank lever when the treadle is depressed to open the gate.

Figure 13 is an enlarged fragmentary side elevation of the gatepost, showing the relationship of the retarding device to the cooperating mechanism of the thrust rods and slide bar with the mechanism in unlatched position.

Figure 14 is a fragmentary rear elevation projected from Figure 13, further illustrating the arrangement of parts constituting the retarding mechanism.

Figure 15 is a sectional view taken on line 15—15, Figure 14, detailing the mechanism and its position with respect to the thrust rods and slide bar.

Figure 16 is a side elevation similar to Figure 13, partly broken away and showing the latching plunger advanced one step corresponding to the position assumed when the first treadle is depressed by the front wheels of a vehicle.

Figure 17 is a diagrammatic view showing the latch plunger advanced to its second step corresponding to the position it assumes when the rear wheel of the vehicle depresses the first treadle.

Figures 18 and 19 diagrammatically illustrate the two steps of retracting the latch plunger upon passage of the front and rear wheels over the second treadle.

Figures 20, 21:
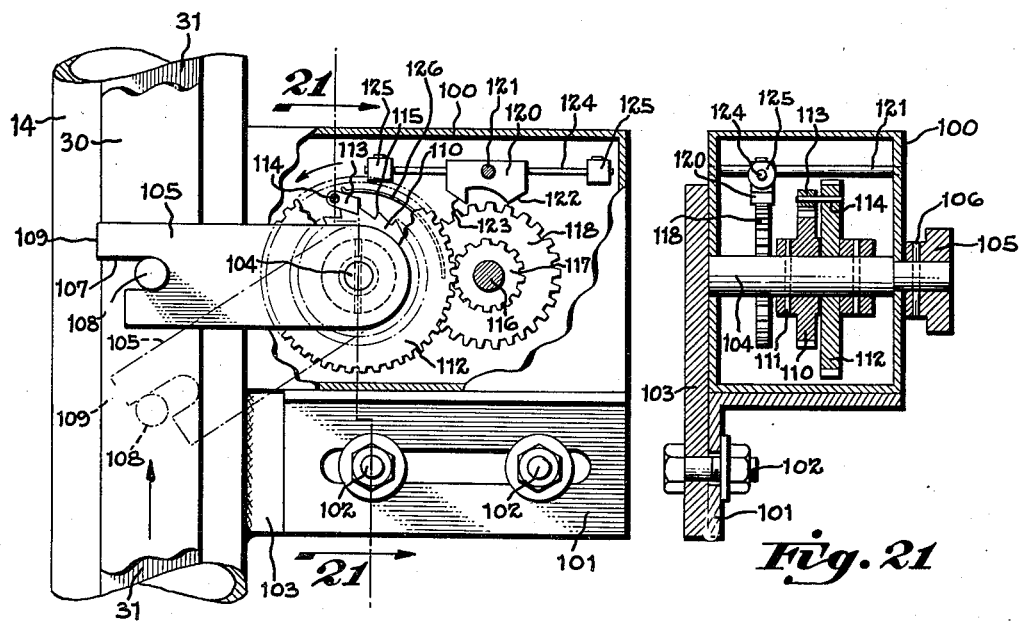

Figure 20 is a fragmentary sectional view illustrating a time delay mechanism arranged to be installed in place of the arresting mechanism as a modification to latch the gate in open position for a predetermined time period instead of by treadle operation.

Figure 21 is a sectional view taken on line 21—21, Figure 20, further detailing the time delay mechanism.

*General structure and operation*

Figure 1:
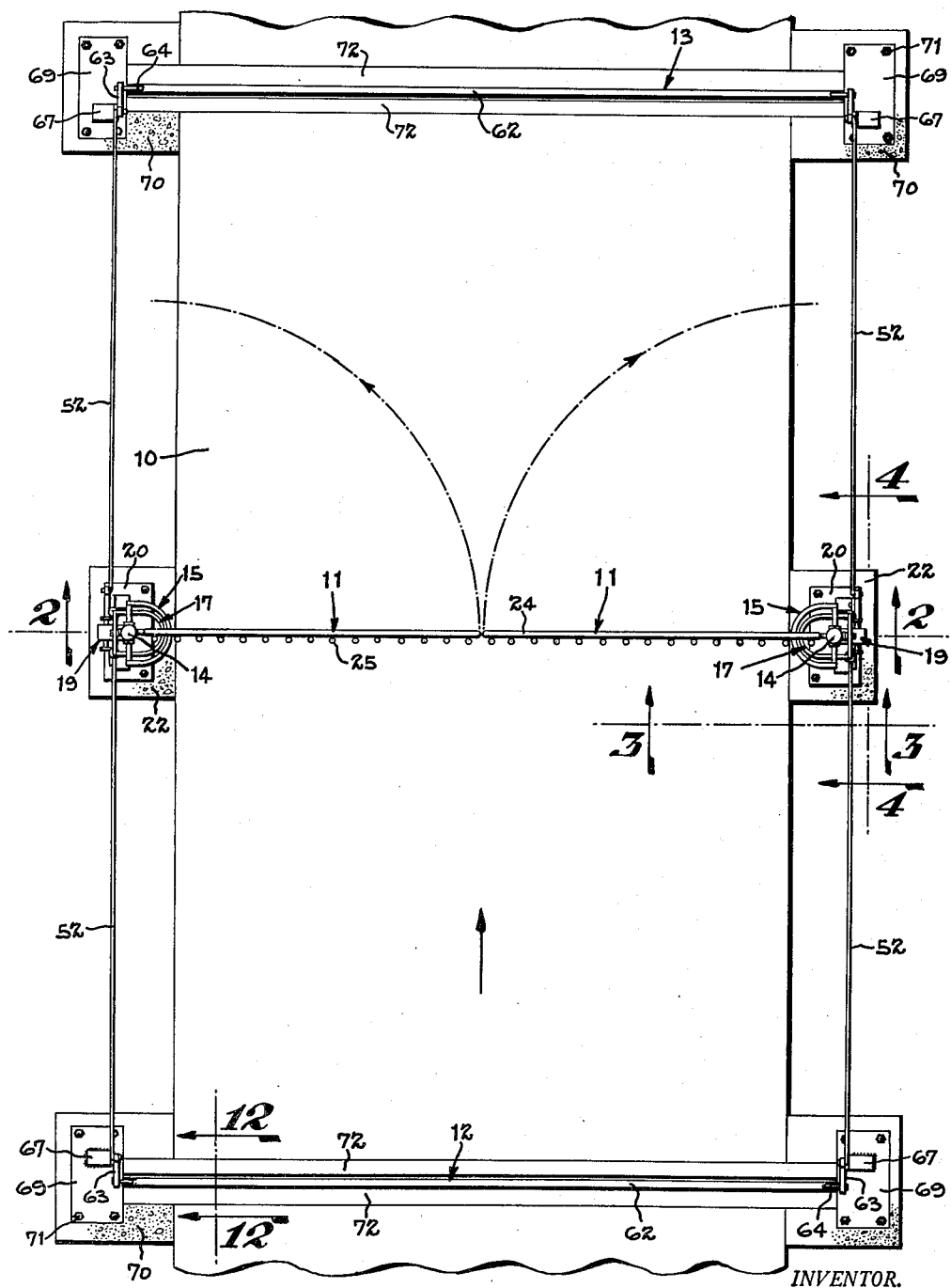
Figure 1 is a top plan view showing the general arrangement of the gates and treadle mechanism with respect to a driveway.
Figure 2:
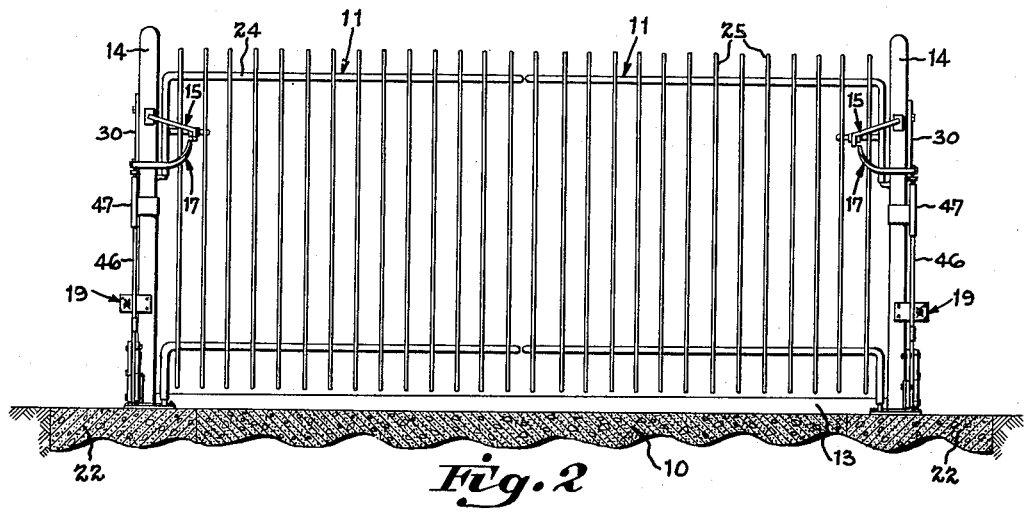
Figure 2 is a sectional view taken on line 2—2, Figure 1, illustrating the structure generally in elevation.

As generally illustrated in Figures 1 and 2, a driveway is indicated at 10, the sections of a double swinging gate are indicated at 11—11, and an outside treadle 12 and an inside treadle 13 extend across the driveway at opposite sides of the gate. When an incoming vehicle depresses the outside treadle, the gates swing inwardly as shown in broken lines in Figure 1, and remain in this position until the vehicle passes through and its rear wheels depress the inside treadle 13. It will be observed that the treadles are spaced sufficiently from the gate so that the rear end of the vehicle is beyond the swing of the gate when the rear wheels depress the inside treadle so as to avoid interference with the vehicle.

As previously indicated, the treadles function in the same manner but in reverse order with respect to an outgoing vehicle; the inside treadle in this case impels the gates outwardly as the vehicle approaches, while the outside treadle causes them to close. Both treadles are spaced an equal distance from the gate so that upon driving through the gate in the opposite direction with the gates swung outwardly, the same amount of clearance will prevail.

As above noted, the gates swing open automatically when the front wheels of the approaching vehicle depress the first treadle; however, it will be observed that they must be held in open position while the vehicle passes through the gateway, otherwise the gates would swing shut upon the moving car before it could clear the gateway. The retarding device hereinafter described in detail responds to actuation of both treadles to hold the gates open until the rear wheels pass over the second treadle and then to release them for closing. In other words, the retarding mechanism operates through a cycle to latch the gate open when the front and rear wheels each depress the first treadle and release the gate after the front and rear wheels each depress the second treadle.

The retarding device operates in the same manner when a vehicle is driven in the outward direction to prevent the gates from being released until the rear wheels of the outgoing vehicle depress the outside treadle 12. In the modified form of the invention, a time delay device holds the gates open for passage of the vehicle; in this instance the second treadle has no effect on gate closing.

As shown generally in Figure 1, the gates 11—11 are hinged upon gate posts 14—14 mounted along opposite sides of the driveway with the gates in closed position extending across the driveway and with a slight clearance between their meeting inner ends. Each gate is held normally in this position by a fixed cam 15 having upper surfaces which are inclined downwardly from opposite sides, terminating at a central latching recess. Each gate is provided with a cam follower 16 tracking upon the downwardly inclined cam surfaces and the hinge connection of the gate permits the gate to rise as the follower tracks upwardly upon the rising surfaces as the gate is opened. Thus, when the gate is swung to open position, the weight load of the gate is carried by the cam follower which in turn rests slidably upon the inclined cam surface causing the gate to swing automatically to closed position by gravity when released. This arrangement is such that the gates can be swung in either direction and will automatically return to the closed and latched position shown when the retarding device releases them. The details of this arrangement are described more fully hereinafter.

Each gate post 14 includes a gate opening cam 17 which is arranged to be moved vertically with respect to the post when either of the treadles 12 or 13 is depressed. The cam 17 is generally semi-circular, as viewed from above (Figure 8) and is nested within the fixed cam 15 so as to cooperate with it. The upper surface of cam 17 is inclined upwardly from opposite sides terminating in a central spur 18 normally disposed beneath the cam follower 16. In addition to its vertical movement, cam 17 also tilts transversely with respect to the follower so as to position the spur 18 on one side of the follower in response to treadle 12 and to position it on the opposite side in response to treadle 13, in the manner shown in Figures 10 and 11.

The cam executes this selective swinging movement as soon as one of these treadles is depressed and before beginning to rise from its lowered position. After the cam tilts to determine the direction of gate movement, it rises vertically from the position shown in Figure 7 to the position shown in Figure 9, thereby swinging the gate to open position and also elevating it, the follower 16 being forced upwardly in following the rising surface of the fixed cam 15.

In the full open position, the fixed and movable cam tracks are angularly related to one another with the follower cradled between them as shown in Figure 9, and the movable cam is locked in the elevated position by the retarding device 19 so as to hold the gate open. In Figures 16 and 17, the retarding device is shown in its engaged position corresponding to the elevated position of the movable cam shown in Figure 9 and the device remains so engaged until the rear wheel of the vehicle depresses the appropriate treadle to release it. Upon release, the movable cam drops to its former position allowing the follower 16 to track downwardly upon the fixed cam 15, thus closing the gate by gravity. The various structural details of the actuating mechanism for the treadle, movable cam, latching mechanism and other structures relevant to the invention, are disclosed hereinafter under the several headings.

*Cam actuating mechanism*

The actuating mechanism for both gate sections 11 is in duplicate, each mechanism being connected in common to the opposite ends of the treadles 12 and 13 for operation in unison. For the sake of simplicity, the following description applies to the mechanism for both gate sections and duplicate numerals are applied to like parts. Each gate post assembly includes a base plate 20 which is preferably welded at the lower end of the post, the plate being secured by nuts 21 embedded in a concrete foundation block 22 as shown in Figure 4, four anchor screws 23 preferably being embedded in the concrete. The base plate can be used as a template to locate the screws when the concrete is poured, or a separate template may be supplied for this purpose. Each gate 11 includes a top and bottom stringer 24—24, formed of tubular material having vertical pales 25 welded to the stringers. As shown in Figures 3 and 9, the inner ends of the stringers are bent downwardly as at 26—26 to form vertical sockets adapted to be slipped upon the hinge pins 27—27 to provide a pivotal connection and to permit the gate to rise vertically as governed by the surface of cam 15. The lower hinge pin rises directly from the base plate 20 and the upper pin includes an angular lower end 28 welded to the gate post to space the hinge pin properly from the post.

The movable cam 17 is carried upon a slide bar 30 which is parallel with the post and spaced slightly from it on the side opposite the gate. Bar 30 is spaced by means of bearing blocks 31 and is held slidably in position by screws 32 threaded into the blocks 31 and traversing vertical slots 33 formed in the bar to permit vertical bar movement. In the present disclosure, a slide block and screw is located respectively at the upper and lower ends of the slide bar and one is located intermediate the length of the bar. The slots 33 are slightly greater in length than the total movement of the bar in order to provide ample clearance for the movements of the slide bar.

Figure 6:
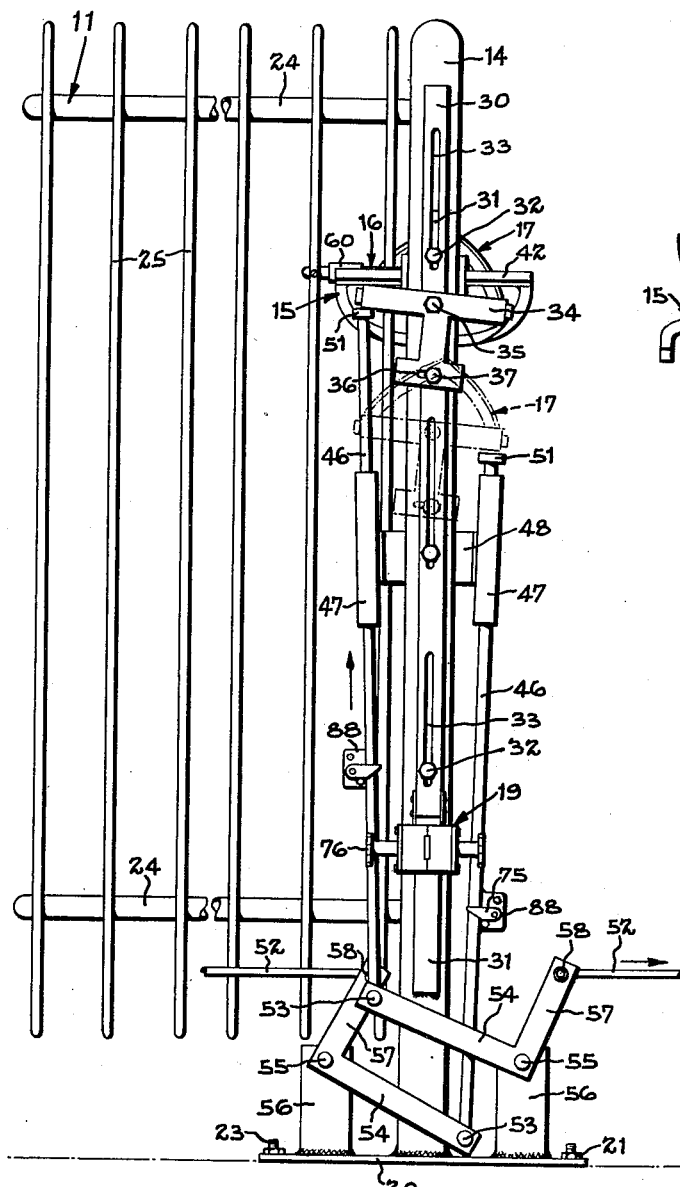
Figure 6 is a view similar to Figure 4, showing the mechanism in the position it assumes when one of the treadles is depressed to open the gate.
Figure 5:
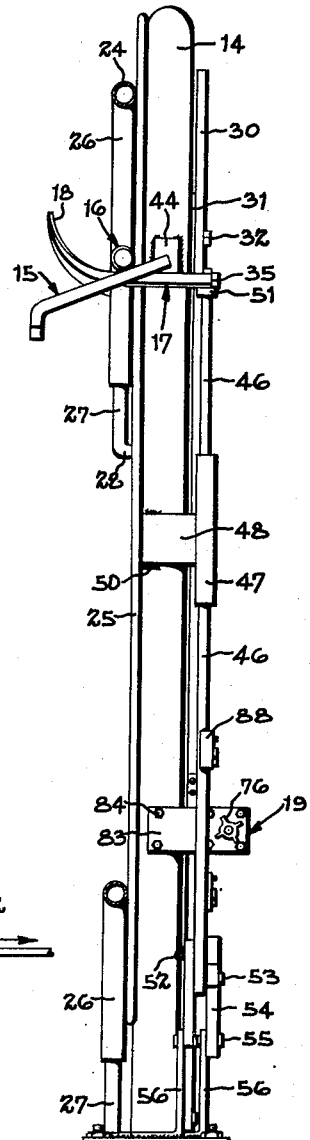
Figure 5 is a general view of the gate similar to Figure 3, but showing the actuating mechanism in elevated position with the gate open.

As best shown in Figures 4 and 6, the movable cam 17 is mounted upon the slide bar by means of a T-shaped rocking yoke 34 which is pivoted at its center by means of a screw 35 threaded into the slide bar. This yoke allows the cam to rock transversely for a limited distance and thereby to determine the direction of gate swing as disclosed in Figures 10 and 11. In order to limit the swinging movement of the cam the lower extremity of the yoke includes a slot 36 traversed by a screw 37, also threaded into the slide bar, the slot being of sufficient length to allow the yoke and cam to rock within the prescribed limits disclosed.

Referring to Figure 8, the movable cam 17 is formed of bar stock and is generally of arcuate shape as viewed from above, having straight limbs 38—38 straddling the post and welded as at 40 to the opposite end of yoke 34. As viewed from the side (Figure 7), cam 17 provides opposed upwardly inclined surfaces which track the follower 16. The inclined surfaces terminate in the spur 18 which resides slightly below the follower when the cam is in lowered position. The cams 15 and 17 are both arcuate in shape and cam 17 nests within the contour of cam 15 and is free to move vertically within cam 15. As shown in Figure 9, follower 16 engages both cam surfaces and the oppositely angulated surfaces cooperate with one another in scissors fashion. As cam 17 rises, its upwardly inclined face engages the follower and forces it through its radius of swing against the upwardly inclined face of the stationary cam 15, the follower being cradled between the two surfaces.

Fixed cam 15 is secured to the post by means of the horizontal arms 42—42 which extend from diametrically opposite sides of the post, with the straight portions 43—43 of the cam straddling the post and being welded directly to the outer ends of the arms. The inner ends of the arms include pads 44 which are welded as at 45—45 to the opposite sides of the posts. It will be noted that the arms 42 are located in a plane above the upper travel limit of movable cam 17 so that there is no interference between the cam and fixed arms.

In Figures 3 and 7, the gate is shown in closed position with the cam 17 lowered and in Figures 6 and 9 the cam is shown in elevated position with the gate open. Cam 17 is actuated for swinging the gate in alternate directions by means of a pair of thrust rods 46—46 having their upper portions slidably confined within a pair of sleeves 47—47. The sleeves are held in position by means of a stirrup 48 straddling the post with the sleeves welded to its spaced outer ends. The stirrup is secured to the post by welding as at 50. The arrangement is such that the heads 51—51 formed on the upper end of the thrust rods engage the outer ends of the T-shaped yoke 34 when the rods are elevated, thereby tilting the yoke and cam and thrusting the cam upwardly in its tilted position.

In the position shown in Figure 6, the left hand push rod 46 is shown in the elevated position which it assumes when the right hand treadle is depressed by the wheels of a vehicle approaching from that direction. The thrust rods are connected to the respective treadles 12 and 13 by means of pull rods 52—52 in crossed relationship such that the treadle on one side of the gate raises the thrust rod on the opposite side of the gate. Thus, the right hand pull rod 52 is drawn to the right as indicated by the arrow when the treadle to which it is connected is depressed, causing the left hand thrust rod to rise. The leverage connection between the treadle and pull rod for developing the necessary motion is illustrated in Figure 12 and is described in detail in connection with that figure.

The lower end of each push rod is pivotally connected as at 53 to one arm of a pair of crossed bell crank levers 54—54. Each lever 54 is pivotally mounted as at 55 upon a bearing block 56 rising from the base plate 20 and the second arm 57 of each bell crank lever is pivotally connected as at 58 to the end of one of the pull rods 52—52. Thus, right hand movement of the right pull rod by the right treadle causes the left hand thrust rod to be elevated and similar movement of the left pull rod by its treadle elevates the right thrust rod. As indicated in broken lines in Figure 6, the movable cam 17 is swung angularly to the right preliminary to its vertical movement so that the left hand inclined track of the cam is presented to the follower. This movement causes the gate to swing to the left when the cam is elevated. Conversely when the left hand treadle is depressed, the right hand thrust rod will tilt the cam to the left before elevating it, thereby causing the gate to swing to the right.

The tilting movements of the cam are limited to the position shown by engagement of the end of slot 36 against the stop screw 37. Continued upward movement of the thrust rod is transferred through the locked yoke to the slide bar 30, causing the bar to be lifted vertically from the position shown in Figure 4 to the elevated position shown in Figure 6. During this movement the follower is engaged against the rising left hand track of cam 17 causing the follower to slide in a direction to swing the gate to open position. If the gate were hinged upon a fixed plane, this action would swing the gate without changing its elevation with respect to the post but in the present structure, the fixed cam 15 presents an inclined plane which raises the gate during its opening movement in order to close it automatically by gravity.

The fixed cam is the preferred arrangement since it functions also as a self-centering latch for holding the gate in closed position by virtue of the latching recess previously noted. This recess 59 is best disclosed in Figures 8 and 10, and is formed centrally of the cam at the juncture of the two downwardly converging tracking surfaces. When the movable cam is lowered, the follower 16, under the weight load of the gate, will slide down the track and drop into the recess, thus latching the gate in closed position by gravity.

It will be noted that the follower 16 includes a slide sleeve 60 of approximately the same diameter as the latching recess. This sleeve is sufficiently long to be engaged both by fixed and movable cams. In its preferred form, the follower is formed of tubular stock welded as at 61 to the upper gate sleeve 26. The follower ring 60 preferably is of brass or similar bearing metal and may be pressed or brazed upon the follower. In order to further strengthen the structure, the outer end of the follower is secured to the intersecting palings either by screws or by welding as shown in Figure 8. Although the latching recess is capable of restraining the gate securely in its closed position, it will be observed that it is readily unlatched upon vertical movement of the cam 17 since the cam produces initially a lifting movement effective to push the follower from the recess at the start of the operation.

When the slide bar and cam reach the elevated position shown in Figure 6, the mechanism is locked temporarily in position by the retarding device 19, as detailed in Figures 13 to 16. After the front wheel passes over the treadle, the thrust rod 46 will drop to its lower position with the cam locked up. Passage of the rear wheels over the same treadle will have no effect other than momentarily to push up the thrust rod. The gate will thus be locked positively in open position shown until the vehicle passes through the gate and actuates the second treadle.

The retarding device 19 is arranged to release the slide bar only when the rear wheels pass over and depress the second treadle permitting the gate to close by gravity as subsequently to be described. It is to be observed at this point, that in its application to a double swinging gate, the two treadles are connected in common to the mechanism of each gate in the manner shown in Figure 1, and that each gate is equipped with an arresting device as disclosed. Consequently, both gates will open substantially in unison and both will close in unison upon release of the retarding mechanism.

It will be observed that when the vehicle approaches the gate from the side opposite from that shown in Figure 6, the right hand thrust rod will rock the yoke and movable cam to the left causing the gate to swing to the right. The arresting mechanism will function in the same manner to lock the gate in open position until the vehicle passes through the gateway and its rear wheels depress the right hand treadle. Briefly therefore, when the vehicle approaches from the right, the right hand treadle provides the operating force to open the gate in the direction of vehicle travel and the left hand treadle releases the gate to close it, and when the vehicle approaches from the left, the left hand treadle develops the gate opening force and the right hand treadle releases the slide bar to allow the gate to close.

*Treadle construction*

As detailed in Figure 12, the treadles 11 and 12 are of duplicate construction, each comprising a bar 62 extending transversely across the driveway with its upper edge projecting above the plane of driveway a sufficient distance to provide the necessary gate opening motion. The opposite ends of the bars are pivotally connected to the swinging ends of a pair of bell crank levers 63—63 by pins 64—64 welded as at 65 to the ends of the bar. The bell crank levers are pivotally mounted as at 66 upon bearing blocks 67 and the upper ends of the bell crank levers are pivotally connected as at 68 to the ends of the pull rods 52. Each bearing block 67 is welded upon a base plate 69 which in turn is anchored to a concrete footing 70 by means of anchor bolts 71 similar to the gate post mounting. Depressing the treadle bar thus swings the bell crank levers as indicated by the broken lines in Figure 12.

The arms of the bell crank levers 63—63 are proportioned with respect to one another to increase the effective motion imparted to the pull rods 52 so that a relatively short treadle movement is sufficient to open the gate. Each treadle bar is loosely confined between angle irons 72—72 embedded in the driveway arranged to provide a slot to receive the bar when it is depressed. The bell crank levers are arranged to impart a pulling force upon the rods 52—52 when the treadle bar is depressed and the full stroke for opening the gate is developed in moving the bar from its elevated position to a position substantially flush with the driveway as indicated by the broken lines.

By using motion increasing levers 54 and 63 and thereby providing a short treadle stroke, considerable downward pressure is required to depress the treadle. This resistance is sufficient to cause the tires of the car or truck to yield slightly upon passing over the bar; consequently the force applied to the gate opening apparatus is cushioned when the wheels roll over the bar. The vehicle preferably should be driven slowly upon approaching the gate and passing over the treadle bar in order to impel the gate gradually to open position; however, even if the bar is depressed and released rapidly, the gate will open. In this case it may not have opportunity, due to inertia, to swing immediately to open position, but instead, may rise vertically as the movable cam is elevated and then swing to open position after the slide bar is locked up by the retarding mechanism. After the gate is open, the vehicle may be driven through the gateway without slowing down for the second treadle since this treadle operates without much resistance to retract the latching plunger.

*Retarding device*

The retarding device 19 for latching the gates in open position during passage of the vehicle through the gateway is detailed in Figures 13 to 19 and its relationship to the operating mechanism is disclosed in Figures 4 and 6. In general, this apparatus consists of an intermittently movable latch plunger 73 which is arranged to engage a depressible catch 74 mounted at the lower end of the slide bar 30 to lock it positively in elevated position when the gate opening treadle is depressed and to release the bar for closing the gate when the second treadle is depressed. In the present arrangement, the locking plunger 73 is advanced two steps forwardly in latching position upon passage of the front and rear vehicle wheels over the first treadle and is retracted in two steps to a release position upon passage of the front and rear wheels over the second treadle.

Briefly described, the lock bar is advanced and retracted by engagement of a pair of push rod pawls 75—75 with a pair of star wheels 76—76, journalled in the retarding device. Upon each actuation of the treadles, one of the star wheels is rotated a quarter turn. Thus, when the first threadle is depressed by the front wheels, the first thrust rod will elevate its pawl 75 and advance the associated star wheel one quarter turn. This will move the latch plunger from the release position shown in Figure 13 to the initial latching position shown in Figure 16. When the rear wheels pass over the first treadle, the same thrust rod will again rise and rotate the star wheel another quarter turn, thus bringing the latch to the full latching position shown in Figure 17.

After passing through the gate, the front wheels of the vehicle depress the second treadle causing the second thrust rod to rise and advance its associated star wheel one quarter turn in the same direction, causing the plunger to be retracted back to the intermediate position (Figure 18). When the rear wheels depress the second treadle, the plunger will be fully withdrawn as shown in Figure 19, permitting the slide bar to drop and thereby allowing the gate to return to closed position by gravity.

Described in detail with reference to Figures 14 and 15, the retarding device consists of a pair of blocks 77—77 slotted centrally to provide a slideway for plunger 73. The blocks also are bored transversely to provide a bearing for the divided shaft 78 which carries the star wheels. The plunger 73 is interposed between the divided shaft sections and connected to them by means of an eccentric pin 80 passing through a slot 81 formed in the rear portion of the plunger. Pin 80 converts the intermittent rotary movements of the shaft and star wheels into stepwise advancement and retraction of the plunger.

The blocks 77 are clamped in assembly by means of screws 82 passing through the blocks at the four corners, and these screws serve also to secure the mounting plates 83—83 to the blocks. The mounting plates straddle the slide bar and are secured to the post 14 by screws 84. The shaft sections 78—78 each include a counterturned portion 85 extending outwardly through the plates 83 and the star wheels 76 are pinned as at 86 to the shafts. By reason of the pin 80, the shaft sections 78—78 rotate as a unit and the plunger is actuated upon intermittent advancement of either of the star wheels.

The pawls 75—75 are pivotally mounted as at 87 upon mounting blocks 88 which are welded to the respective push rods 46 in a position to reside below the star wheels when the thrust rods are in lowered position (Figure 14). A stop pin 90 is fixed in each block 88 to maintain the pawl in extended position and a second stop pin 91 is arranged to prevent the pawl from swinging outwardly beyond a fixed limit. Upon upward movement of the thrust rod, the pawl establishes a positive engagement with one of the teeth of the star wheel which is interposed in its path of movement to rotate the wheel one quarter turn. When the thrust rod descends, the pawl swings upwardly in passing, then drops back against the stop pin 90.

The depressible catch 74 is pivotally mounted as at 92 between a pair of spaced mounting plates 93—93 secured upon the lower end of the slide bar 30 (Figure 13). These plates are secured by screws 94—94 to the slide bar 30, with the catch 74 pivotally interposed between the plates. A flat spring 95 is secured to the lower end of the catch to maintain it normally in extended position.

As the slide bar 30 is elevated, the pawl advances the latch plunger before the catch 74 reaches the plunger, consequently the catch passing across the angulated end 96 of the plunger will depress, then snap back to its original position to establish a positive engagement with the plunger as shown in Figure 16. The first advance of the plunger is insufficient to engage the surface of slide bar 30 and of course in its second advancement the end of the slide bar is above the plunger with the catch resting upon the plunger; therefore there is no interference when the plunger moves to its fully extended position of Figure 17. The plunger remains in this position with the gate latched positively in open position until the vehicle is driven through the gateway to retract it in passing over the second treadle.

It will be noted that the latch plunger will be advanced to latching position before the slide bar is fully elevated so as to depress the spring catch 74 and engage it as soon as the bar tends to drop. This locks the slide bar up when the front wheels pass over the first treadle and depress and release it. By operation of the movable cam, the gate need not open at a rate correlated to the vertical movement of the cam but if necessary, the gate will rise then open as the follower slides down the movable cam. Thus the mechanism will not fail even though the driver inadvertently approaches too fast, instead the retarding mechanism will immediately engage the slide bar and hold it up after the treadle is released, causing the cam to open the gate at a moderate speed by gravity.

*Time delay retarding mechanism*

A timing device arranged to hold the gate in open position for a predetermined time interval is illustrated in Figures 20 and 21. This unit is arranged to be installed on the gate post to engage and to latch the slide bar in elevated position for a time interval sufficient to allow the vehicle to pass through the gates. At the end of this period the slide bar is allowed to drop by gravity and permit the gate to close as above described. The timer device is automatic in operation and is powered by the weight load of the slide bar and associated parts, the slide bar being elevated by the force exerted by the treadle and being arrested in elevated position by the timer. As soon as the wheels leave the treadle the weight load of the parts causes the timer to operate in bar releasing direction. The timer includes an adjustable escapement mechanism which governs its releasing motion as hereinafter described.

As shown in Figure 20, the timer includes a housing 100 which is mounted upon angle bracket 101, the angle bracket being mounted by screws 102 upon a flat plate 103 which is welded to the gate post. The unit may be mounted at any point along the gate post in the area traversed by the slide bar or, if desired, it may be mounted approximately at the same position as the retarding device 19 previously described. Within housing 100, there is journalled a cross shaft 104 having on its outer end, a latch arm 105 which is pinned as at 106 to the shaft.

The outer swinging end of arm 105 includes a slot 107 adapted to straddle and confine a pin 108 projecting outwardly from slide bar 30. Slot 107 provides an extended finger 109 which is engaged by the pin 108 when the arm is in lowered position as shown in broken lines in Figure 20. When the arm is forced by the pin to its upper horizontal position shown in full lines, the pin is confined in the slot with the weight load of the slide bar imposed upon the arm.

The escapement mechanism, as hereinafter described, allows the arm 105 to move slowly down to its lowered position to allow the pin 108 to free itself from the slot, whereupon bar 30 drops to gate opening position. The pin is engaged by the arm near the upper limit of bar movement so that in the position of the latch arm shown in full lines corresponds to the fully elevated position of the slide bar and movable cam.

A ratchet wheel 110 is pinned as at 111 to cross shaft 104 and a gear 112 is loosely journalled upon the shaft adjacent ratchet wheel. A pawl 113 is pinned as at 114 to the side of the gear and arranged to be engaged by the teeth 115 of the ratchet wheel. Since the arm and ratchet wheel are both pinned to the shaft, the ratchet wheel is forced under the weight load of bar 30 in the direction indicated by the arrow in Figure 20 and the rotary movement is transmitted by the pawl 113 to the gear 112 which is controlled by the escapement mechanism.

The escapement mechanism includes a shaft 116 loosely journalling a pinion 117 meshing with gear 112. An escapement wheel 118 is attached to pinion 117 for unitary rotation with the gear. The rotation of the escapement wheel is regulated by an escapement pawl 120 pivotally mounted as at 121 and provided with an inclined escape tooth 122 and a stop tooth 123. Paul 120 further includes a cross rod 124 extending from opposite sides and the rod and the outer ends of the rod carry weights 125—125 which are slideably secured to the rod for adjustment purposes.

The escapement pawl is free to oscillate with respect to its mounting pin 121 so that the teeth 122 and 123 alternately stop and release the teeth of the escapement wheel and thus control the rotation of pinion 117 and gear 112 under the downward thrust of bar 30. By adjusting the weights 125 upon the rod 124, the oscillating frequency of the escapement pawl and consequently, the rate of arm movement can be regulated to provide the desired time interval.

In operation, the ratchet wheel 110 is rotated in a clockwise direction as viewed in Figure 20 when the latch arm is engaged by the rising pin, the ratchet pawl 113 being arranged to permit movement in this direction while the gear train and escapement mechanism remains stationary. The pawl is engaged by a spring 126 for this purpose, the fixed end of the spring 126 being anchored in holes drilled in the gear 112 while its free end yieldably presses the pawl against the ratchet teeth. When the slide bar 30 is fully elevated and the treadle released, the weight load of the bar will be transferred to the arm and transmitted through the latch arm to the ratchet wheel and from the ratchet wheel through the pawl to the gear train. During the downward movement of the arm, the ratchet wheel and gear turn in the direction indicated by the arrow in Figure 20. The escapement pawl will then oscillate and allow gear 112 to rotate under the influence of arm 105 until the slide bar 30 is released. This arrangement restrains the gate in open position independently of the operation of the treadles, consequently it will reliably control the gate closing operation independently of the number of wheels passing over the treadles.

In the structure illustrated, the double swinging gate is designed to harmonize with an ornamental steel picket fence, but it is contemplated to apply the structure to the ordinary farm fencing either at the main gate or in various interior section fences to keep live stock from straying. The apparatus naturally lends itself to a great many uses other than those outlined and can be arranged to meet special requirements by simple changes in adjustment.

I claim:

1. A vehicle actuated gate operating mechanism comprising, a gate post, a gate, hinge means connecting the gate to the post, said hinge means providing horizontal swinging movement and vertical movement of the gate relative to the post, a fixed cam mounted on the gate post and having an inclined camming surface, a cam follower mounted upon the gate and adapted to track upon said camming surface, the cam follower imposing the weight load of the vertically movable gate upon the inclined cam surface, the cam surface being inclined in a direction to urge the gate normally toward a closed position by the weight load of the gate upon camming surface, a movable cam having a camming surface inclined in a direction opposite to the fixed cam and adapted to engage the said follower, guide means for said movable cam mounted with the gate post and adapted to guide the cam for movement in a vertical direction with respect to the fixed cam, said movable cam being arranged to engage the follower and swing the gate to an open position when the cam is elevated, an actuating mechanism connected to the movable cam and adapted to elevate and lower the same, a treadle located at the approach side of the gate, connecting means extending from the treadle to the actuating mechanism, the actuating mechanism being adapted to elevate the movable cam and thereby open the gate when a vehicle actuates the treadle upon approaching the gate.

2. A vehicle actuated driveway gate apparatus comprising, a gate post, a gate pivotally mounted on the post, the said gate being arranged to move vertically and to swing horizontally in either direction in response to the direction of vehicle approach, means mounted on the post for urging the gate normally toward closed position, a vehicle actuated member disposed respectively on opposite sides of the gate, a vertically movable cam having a pair of downwardly diverging camming surfaces, a cam follower mounted on the gate above said vertically movable cam adapted to be engaged by the cam upon vertical movement thereof, mounting means for the movable cam providing tilting movements thereof with respect to the follower whereby the camming surfaces are presented selectively to the follower, connecting means extending from both of said vehicle actuated members constructed and arranged to tilt the cam selectively in opposite directions when the respective members are actuated by an approaching vehicle, the connecting means being arranged to move the cam vertically in said tilted position, the said diverging camming surfaces being arranged to engage and swing the cam follower and gate in alternate directions upon actuation of the respective vehicle actuated members.

3. A vehicle actuated gate operating mechanism comprising, a gate post, a plurality of vertical hinge pins mounted upon the gate post and spaced therefrom, a gate having tubular members extending therefrom telescopically engaged upon the said hinge pins to provide swinging gate movements in either direction in a horizontal plane and bodily movement of the gate in a vertical plane, a fixed cam mounted on the gate post, a cam follower mounted upon the gate adapted to engage the fixed cam, the fixed cam having a pair of downwardly converging camming surfaces and having a latching recess at the intersection of the camming surfaces adapted to latch the follower and gate in closed position, a gate opening cam slidably mounted on the post for movement vertically with respect to the fixed cam and having a pair of upwardly converging camming surfaces oppositely related to the camming surfaces of the fixed cam and adapted to force the cam follower upwardly from the latching recess and upon the said camming surfaces, a pair of treadle mechanisms located at opposite sides of the said gate adapted to be depressed by the wheels of a vehicle, and connecting means extending from the said treadle mechanisms respectively to the gate opening cam, the said connecting means being constructed and arranged to tilt the gate opening cam laterally and to elevate the same in tilted position to force the follower to gate opening position in alternate directions responsive to the operation of the respective treadle mechanisms.

4. A vehicle actuated gate operating mechanism comprising, a gate post, a gate, pivotal connecting means on the gate post for hingedly mounting the gate to provide swinging movements in either direction in a horizontal plane and movement of the gate in a vertical plane, a fixed cam mounted on the gate post, a cam follower mounted upon the gate for arcuate movement therewith adapted to engage the fixed cam, the fixed cam being of arcuate shape in the horizontal plane and having a pair of downwardly converging camming surfaces, the weight load of the vertically movable gate being imposed by the cam follower upon the downwardly converging camming surfaces to urge the gate normally to closed position by gravity, a gate opening cam of arcuate shape in the horizontal plane nested within the fixed cam and adapted to engage the cam follower, a slide member mounted upon the post and movable vertically relative to the post, pivot means connecting the gate opening cam to the slide member, the pivot means and slide member providing lateral tilting movements and vertical movement of the gate opening cam with respect to the fixed cam, the gate opening cam having a pair of upwardly converging camming surfaces oppositely related to the camming surfaces of the fixed cam and adapted to force the cam follower upwardly upon the fixed cam, a pair of shiftable treadle mechanisms located at opposite sides of the said gate adapted to be depressed by the wheels of a vehicle, and actuating means connecting the said treadle mechanisms respectively to the gate opening cam, the said actuating means including a pair of cam shifting members which are shifted individually in response to shifting of the respective treadle mechanisms, the shifting members being engageable with the gate opening cam on opposite sides of said pivot means, the shifting members thereby being effective to tilt the gate opening cam laterally and to elevate the same in tilted position to force the follower in gate opening position in alternate directions responsive to the operation of the respective treadle mechanisms.

5. A vehicle actuated gate operating mechanism comprising, a pivotally mounted gate, the said gate being arranged to swing horizontally in either direction and to move in a vertical plane, a fixed cam, a follower mounted upon the gate and adapted to track upon the fixed cam, the weight load of the vertically movable gate being imposed by the follower upon the fixed cam, the fixed cam being constructed and arranged to urge the gate normally in closed position by gravity, a gate opening cam mounted beneath the cam follower, a slide bar slidably mounted on the post and movable vertically relative to the post, pivotal mounting means connecting the gate opening cam to the slide bar, the pivotal mounting means providing tilting movements of the gate opening cam and the slide bar providing vertical movements of the gate opening cam, the gate opening cam having a pair of upwardly converging camming surfaces engageable with the follower to force the same in gate opening position when the cam is elevated, the pivotal mounting means for the gate opening cam adapting the same to tilt laterally with respect to the said follower and thereby to present the camming surfaces selectively to the folower, a pair of depressible treadles located respectively at opposite sides of the gate, actuating means connecting both of said treadles to said gate opening cam, the said actuating means including a pair of thrust members which are shifted individually in response to depression of the respective treadles, the thrust members being engageable against the gate opening cam on opposite sides of said pivotal mounting means, the thrust members thereby being effective to tilt the gate opening cam laterally in alternate directions upon depression of the respective treadles, then to elevate the same vertically to determine the direction of gate swing prior to elevating the cam, and a retarding device operatively connected to the slide bar and constructed and arranged to latch the same in an elevated position after the treadle is released and to unlatch the movable cam when the vehicle passes through the gateway and depresses the second treadle.

6. A vehicle actuated gate operating mechanism comprising, a gate post, a pivotally mounted gate, the said gate being arranged to swing horizontally in either direction and to move in a vertical plane, a fixed cam mounted on the gate post, a follower mounted upon the gate and adapted to track upon the fixed cam, the fixed cam being constructed and arranged to urge the gate normally in closed position by gravity, a gate opening cam associated with the fixed cam, a slide bar slidably mounted on the post and movable vertically with respect to the post, pivotal mounting means connecting the gate opening cam to the slide bar, the pivotal mounting means providing lateral tilting movements of the gate opening cam and the slide bar providing vertical movement of the gate opening cam, the gate opening cam having a pair of upwardly converging camming surfaces engageable with the follower to force the same in alternate gate opening directions when the cam is elevated, the pivotal mounting means for the movable cam adapting the cam to tilt laterally in opposite directions with respect to the cam follower and thereby to present the camming surfaces selectively to the follower, a pair of depressible treadles located respectively at opposite sides of the gate, actuating means connecting both of said treadles to said gate opening cam, the said actuating means including a pair of thrust members which are shifted individually in response to depression of the respective treadles, the thrust members being engageable against the gate opening cam on opposite sides of the pivotal mounting means, the thrust members thereby being effective to tilt the movable cam laterally in alternate directions upon depression of the respective treadles, then to elevate the same vertically to determine the direction of gate swing prior to elevating the cam, the said actuating means being constructed and arranged to tilt the gate opening cam in a direction to swing the gate away from a vehicle approaching and depressing a treadle on one side of the gate and to swing the gate in the opposite direction upon depressing the treadle on the opposite side of the gate.

7. A vehicle actuated gate operating mechanism comprising, a gate post, a gate mounted upon said post and arranged to swing horizontally in either direction and to move in a vertical plane, a fixed cam mounted upon the gate post having a pair of downwardly converging camming surfaces, a cam follower mounted upon the gate and adapted to track upon said camming surfaces to urge the gate normally to a closed position by gravity, a movable cam having upwardly converging camming surfaces angularly related to the fixed cam and engageable with the follower, a slide bar mounted for vertical movement upon the gate post for actuating the movable cam, pivotal means connecting the movable cam to the slide bar, a pair of push rods slidably mounted for vertical movement at opposite sides of the post beneath the movable cam, the push rods being engageable against the under side of the movable cam at opposite sides of the cam and arranged to tilt the same in alternate directions and to elevate the movable cam in tilted position and thereby to open the gate in alternate directions corresponding to the direction in which the cam is tilted, a pair of depressible treadles located at opposite sides of the gate, and respective connecting means extending between said treadles and push rods arranged to elevate the push rods upon depression of the treadles, the said movable cam being arranged to swing the gate to open position in a direction away from the treadle which is depressed.

8. A vehicle actuated gate operating mechanism comprising, a gate post, a gate mounted upon said post and arranged to swing horizontally in either direction and to move in a vertical plane, a fixed cam mounted upon the gate post having a pair of downwardly converging camming surfaces, a cam follower mounted upon the gate and adapted to track upon said camming surfaces to urge the gate normally to a closed position by gravity, a movable cam having upwardly converging camming surfaces angularly related to the fixed cam and engageable with the said cam follower, a slide bar mounted for vertical movement upon the gate post for actuating the movable cam, a yoke pivotally mounted on the slide bar for mounting the movable cam, stop means for limiting the pivotal movements of the yoke, a pair of vertically movable push rods at opposite sides of the post beneath the yoke, the upper ends of the push rods being engageable against opposite ends of the yoke and arranged to tilt the same in alternate directions and thereby to elevate the movable cam in tilted position to open the gate in alternate directions corresponding to the direction in which the cam is tilted, and a pair of treadles located at opposite sides of the gate constructed and arranged to elevate the individual push rods upon depression of the respective treadles, the said movable cam being arranged to swing the gate to open position in a direction away from the treadle which is depressed, and a device adapted to latch the slide bar in elevated position temporarily upon depression and release of the treadles to cause the gate to swing to open position after the depressed treadle is released.

9. A vehicle actuated gate operating mechanism comprising a gate post, a gate mounted upon said post and arranged to swing horizontally in either direction, means mounted on the post for urging the gate normally toward a closed position, a cam follower mounted upon the gate, a movable cam having upwardly converging camming surfaces engageable with the said cam follower, a slide bar mounted for vertical movement upon the gate post for actuating the movable cam, pivotal means connecting the movable cam to the slide bar, a pair of vertically movable push rods mounted at opposite sides of the post beneath the movable cam engageable with opposite sides of the cam and arranged to tilt the same in alternate directions upon vertical movement of the respective push rods, the respective push rods adapted to elevate the movable cam in tilted position and thereby to open the gate in alternate directions corresponding to the direction in which the cam is tilted, a pair of treadles located at opposite sides of the gate constructed and arranged to elevate the push rods selectively upon depression of the treadles, a gate retarding device mounted on the gate post having a plunger adapted to latch the said slide bar in elevated position when either of said treadles is depressed and released, star wheels on the said retarding device arranged to advance and retract the plunger in steps upon each partial revolution of the star wheels, and respective pawls on the push rods engageable with the star wheels and arranged to advance the plunger in steps to a latching position when one of said treadles is depressed and released by the front and rear wheels of a vehicle and to retract the plunger in steps when the second treadle is depressed and released by the front and rear wheels of the vehicle.

10. A vehicle actuated gate operating mechanism for a driveway or the like comprising, a pair of gate posts mounted at opposite sides of the driveway, a pair of gates mounted upon said gate posts and arranged to swing horizontally in either direction and to move vertically, a cam mounted on each of said posts, a respective cam follower on each of said gates cooperating with said cam and arranged to urge the gates normally in closed position by gravity, a gate opening cam slidably mounted on each of the gate posts arranged to be rocked transversely and to be moved vertically, said gate opening cams being located beneath the respective cam followers and arranged to engage said cam followers and swing the gates unitarily to open position when the gate opening cams are elevated, the gate opening cams having upwardly converging camming surfaces arranged to swing the gates in either direction in accordance to the lateral position of the cams, a respective treadle extending across the driveway at opposite sides of the gates, connecting means extending in common from corresponding ends of each of said treadles to the individual gate opening cams, the said connecting means being arranged to rock the gate opening cams alternately in opposite directions and then to elevate the cams and thereby to swing both gates selectively in unison in a direction away from the treadle which is depressed whereby the gates swing to open position in a direction corresponding to the travel of a vehicle in either direction.

WINFORD L. ENGHAUSER.

References Cited in the file of this patent

UNITED STATES PATENTS

| Number | Name | Date |
|---|---|---|
| 969,678 | West | Sept. 6, 1910 |
| 1,280,916 | Weikert | Oct. 8, 1918 |
| 1,297,949 | Werezak | Mar. 18, 1919 |
| 2,086,061 | Barr | July 6, 1937 |
| 2,523,616 | Fox | Sept. 26, 1950 |